United States Patent [19]

Enemark et al.

[11] 4,396,910

[45] Aug. 2, 1983

[54] CODED SECURITY SWITCH

[75] Inventors: Robert B. Enemark, Duxbury; Stephen Marchetti, Norwell, both of Mass.

[73] Assignee: American District Telegraph Company, New York, N.Y.

[21] Appl. No.: 146,011

[22] Filed: May 2, 1980

[51] Int. Cl.[3] .......................... G08B 1/08; H04Q 7/00

[52] U.S. Cl. .................................... 340/539; 340/514; 340/526; 340/531; 340/534; 340/309.15

[58] Field of Search ............... 340/539, 526, 531, 534, 340/540, 545, 514, 870.16, 870.09, 870.11, 309.1, 307; 455/91, 8, 9, 115

[56] References Cited

U.S. PATENT DOCUMENTS

| | | | |
|---|---|---|---|
| 3,848,231 | 11/1974 | Wootton | 340/539 |
| 3,906,348 | 9/1975 | Willmott | 340/539 |
| 4,095,211 | 6/1978 | Shaughnessy | 340/539 |
| 4,109,239 | 8/1978 | Davis | 340/539 |
| 4,191,948 | 3/1980 | Stockdale | 340/539 |
| 4,207,559 | 6/1980 | Meyer | 340/531 |
| 4,257,038 | 3/1981 | Rounds et al. | 340/539 |

*Primary Examiner*—Donnie L. Crosland
*Attorney, Agent, or Firm*—Weingarten, Schurgin, Gagnebin & Hayes

[57] ABSTRACT

For use in an alarm system, a security switch is provided, the transition state of which is detected by an associated circuit and a coded signal transmitted along a communication path indicative of the transition state, this coded signal being received and decoded to provide an output indication of the switch state.

15 Claims, 5 Drawing Figures

CODED SECURITY SWITCH

FIELD OF THE INVENTION

This invention relates to alarm systems, and more particularly to a coded security switch for providing a signal indication of the switch transition states.

BACKGROUND OF THE INVENTION

In an alarm or security installation, it is often required to detect the status of electrical switches which are employed in door and window sensors or other alarm sensors. Apparatus is known for providing coded signals which represent the open and closed states of a switch, examples being shown in U.S. Pat. Nos. 3,524,179; 3,729,735; and 4,057,783. In U.S. Pat. No. 3,524,179 distinctive audio tones are produced in response to opening or closing of a switch, a magnetic switching core being employed to sense the transition of a double throw switch. U.S. Pat. No. 3,729,735 describes a control circuit for control of an air conditioner in which the switch closure or opening actuates respective tuning forks to generate respective ultrasonic signals. U.S. Pat. No. 4,057,783 employs an electromagnetic assembly for providing in response to relative rotary movement signals dependent upon switch state and from the phase of which an output signal is derived.

SUMMARY OF THE INVENTION

In brief, the present invention provides a coded security switch which can be implemented in microcircuit form to provide an economical and reliable package capable of producing respective coded output signals representing corresponding switch transition states as well as predetermined supervisory indications, such as low battery condition, system test, and others. The invention comprises a switch, the transition states of which are to be monitored and which can be a mechanical, electromechanical, or electronic switching device and which is coupled to an associated solid state logic circuit. The logic circuit is operative in response to the respective transition states of the switch, from an open to a closed condition and from a closed to an open condition, to produce corresponding coded output signals which are employed for transmission to a receiving site. In preferred implementation, the coded signals are employed to modulate an RF transmitter which provides a coded RF signal representing the detected switch states. A receiver is provided to receive and decode the transmitted signals and provide an output indication of the detected switch states. It is contemplated that the coded signals can alternatively be transmitted by ultrasonic transmission or by transmission along a wire communication path.

DESCRIPTION OF THE DRAWINGS

The invention will be more fully understood from the following detailed description taken in conjunction with the accompanying drawings, in which.

DETAILED DESCRIPTION OF THE INVENTION

Figure 1:
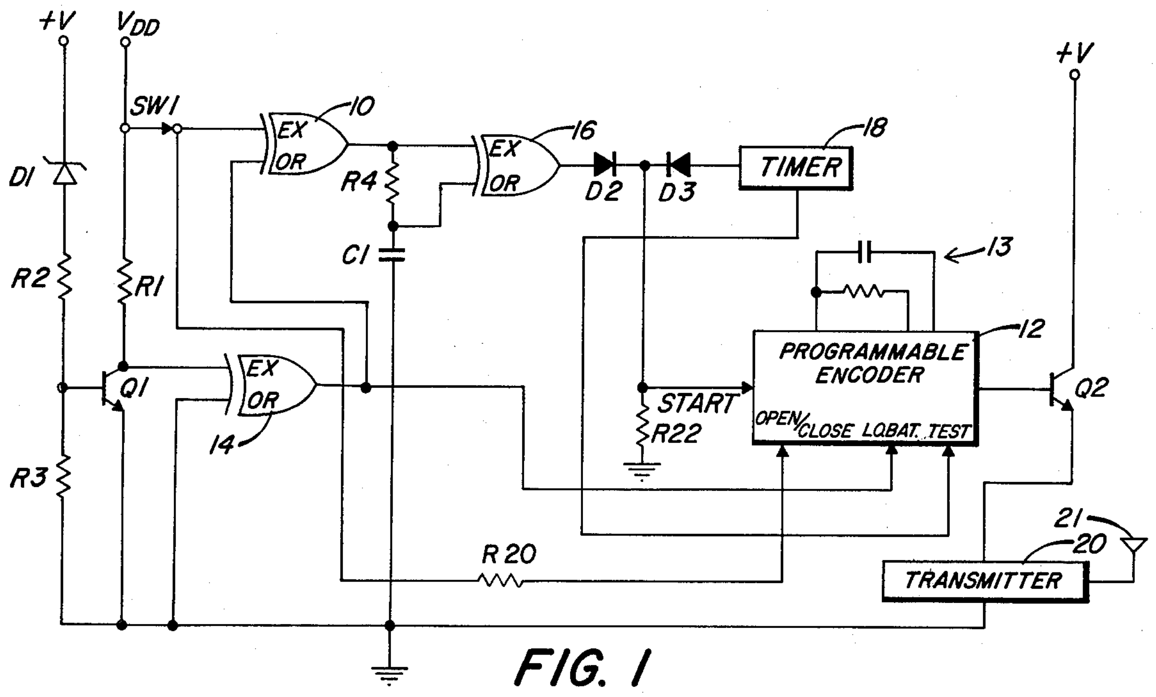
FIG. 1 is a schematic diagram of a preferred embodiment of a coded security switch circuit in accordance with the invention.

One preferred embodiment of the invention is shown in FIG. 1 and is operative to provide a signal for transmission over a communication path and which is coded to represent the open and closed transition states of a switch. The switch SW1 is a single pole, single throw switch and which typically is employed in an alarm system to sense the opening and closing of a door or window. It is recognized, however, that the switch can be employed for any purpose in an alarm and other type of system. One switch terminal is connected to a voltage source $V_{DD}$ and via a resistor R1 to the collector of a transistor Q1, the emitter of which is grounded. The base of transistor Q1 is connected to a voltage divider composed of resistors R2 and R3 and Zener diode D1 connected between a positive voltage source +V and ground. The second switch terminal is connected to one input of an exclusive OR gate 10 and to a resistor R20 from which is derived a close or open logic signal for application to a data input of programmable encoder 12. The collector electrode of transistor Q1 is connected to one input of an exclusive OR gate 14, the second input of which is connected to ground, and the output of which is connected to the second input of gate 10.

The output of gate 10 is connected to one input of an exclusive OR gate 16, the second input of which is connected to the junction between a resistor R4 and a capacitor C1 which is connected in series between the output of gate 10 and ground. The output of gate 16 is connected by a diode D2 to a resistor R22 from which a signal is provided to the start terminal of encoder 12. The output of gate 14 is connected to a data input of encoder 12. A timer circuit 18 is coupled via a diode D3 to the start terminal of the encoder 12, and to the test input of the encoder. The output of the encoder is applied via a transistor voltage follower Q2 to the transmitter 20, which provides the coded output for transmission along a communication path to an associated receiver.

In the illustrated embodiment, the transmitter 20 is an RF transmitter providing a coded RF signal in the form of modulated RF pulses which are radiated by means of an antenna 21. The transmitter can alternatively be of the ultrasonic type to provide coded ultrasonic signals which are propagated by a suitable transducer. As a further alternative, the coded signals can be of a form for transmission along a wire path rather than a wireless cmmunication path.

The circuit of FIG. 1 is operative to detect the transition of the switch SW1 from an open to a closed state or from a closed to an open state and to signify this detection by transmission of a respectively coded signal. After a predetermined interval following a change of switch state, the circuit remains in a quiescent condition and produces no coded output signal. Assume that the switch SW1 is closed after having been in an open condition. Upon such switch closure, gate 10 provides a high logic level output, which in turn causes gate 16 to provide a high logic level output for a duration determined by the time constant of resistor R4 and capacitor C1, and which provides a start signal to the programmable encoder 12. The switch closure also causes a high logic level input to the open/close control input of the encoder 12 to select the code which signifies the closed transition state of the switch. The encoder 12 provides the predetermined output code via the voltage follower Q2 to the transmitter 20. The transmitter 20, which in the case of an RF transmitter includes an antenna 21, transmits the coded RF pulses which signify the closed transition state of the switch SW1, and which pulses will be received and decoded to denote the detected switch state. Usually the codes are termed a supervisory code and an alarm code for the respective closed and open states.

When the switch SW1 is opened after being in a previously closed condition, the operation of the circuit is as previously described, except that a different transmission code is provided by encoder 12 in response to the presence of a low logic level signal applied to the open/close input of the encoder 12.

The timer 18 provides a test pulse at predetermined time intervals in order to cause transmission of a test code for purposes of monitoring the operability of the switch detecting circuit. As an example, such a test pulse can be provided once a day and causes application of a start pulse via diode D3 to the encoder 12, and selection of the test code by provision of the test pulse to the test input of the encoder. The timer 18 can be of any known form and can be adjustable to provide the test pulse at selected intervals.

The programmable encoder 12 in a preferred embodiment is a monolithic CMOS encoder/decoder, such as the ED-15 of Supertex, Inc. This encoder has a 15-bit data input which can be employed to generate 32,768 possible codes. A positive signal transition at the start input commences the transmission of data, and one data word is transmitted during an operating interval. The device is also operative as a decoder in the associated receiver for decoding of the transmitted coded signal. The code format can be of any selected form. Typically, the code format includes a predetermined number of pulses defining a start code, following which the data bits or status bits of the switch or status states are provided. The encoder includes an internal oscillator, the frequency or clock rate of which is selectable by external resistor-capacitor network 13.

Alternatively, the encoder 12 can be of a type which remains operative so long as the start signal is high. Thus, the encoder will transmit data for an interval specified by duration of the start pulse from gate 16.

The circuit of FIG. 1 is typically operated from a battery source, such as a conventional 9-volt battery, and a low battery indication can be provided as one of the status codes so that a fresh battery can be installed. The Zener diode D1 is normally conducting, as is transistor Q1, to cause the output of gate 14 to be at a low logic level. When the battery voltage +V falls below the Zener voltage, diode D1 switches off, causing transistor Q1 to turn off, and causing gate 14 to provide a high output level which is applied to the selected input of encoder 12. Gate 10 will, when activated, then provide a high output level to cause gate 16 to provide a start signal to the encoder 12, which will cause the transmission of a low battery code in response to the data input specified by the high level signal from gate 14, and in addition will transmit a code determined by the position of switch SW1.

Figure 2:
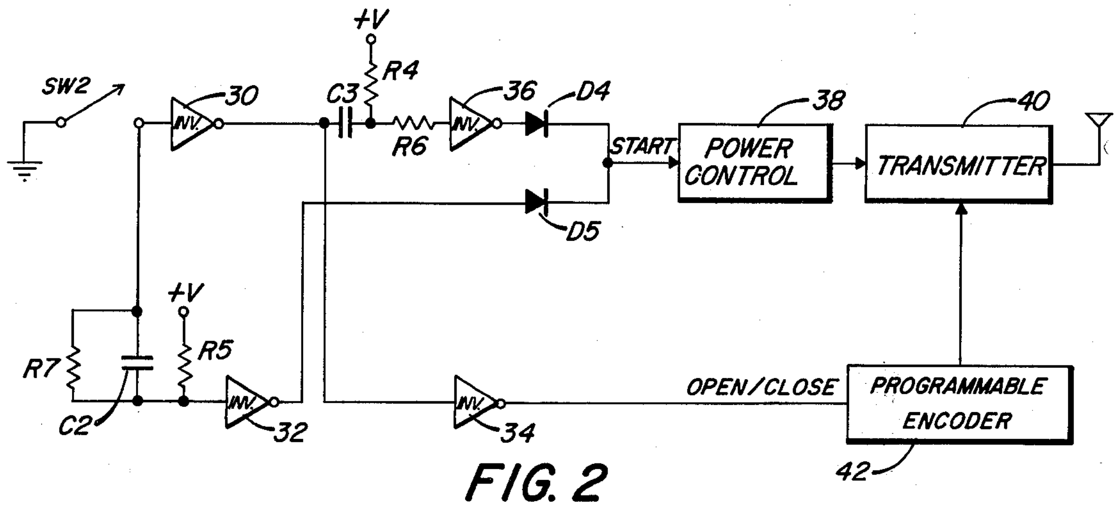
FIG. 2 is a schematic diagram of an alternative embodiment of the coded security switch circuit.

An alternative embodiment is shown in FIG. 2. The switch SW2 to be monitored is connected between a source of negative reference voltage, typically ground, and the input of an inverter 30. The input switch terminal is also coupled via a parallel RC circuit composed of resistor R7 and capacitor C2 to the input of a second inverter 32, which has a resistor R5 connected to a positive reference potential. The output of inverter 30 is connected to the input of an inverter 34, and via an RC circuit composed of capacitor C3 and resistors R8 and R6 to the input of an inverter 36. The output of inverter 36 is coupled via a diode D4 to the input of a power control circuit 38. The output of inverter 32 is also coupled via a diode D5 to the input of the power control circuit. The power control circuit is operative to drive transmitter 40, the output of which is the coded output signal indicative of the state of the switch SW2. The status code is provided by programmable encoder 42, which modulates the transmitter carrier. The encoder produces respective codes in accordance with the input level applied to the open/close input of the encoder. In this embodiment, the encoder is always enabled and produces an output code in accordance with the open/close control input level. The transmitter is enabled when the power control circuit 38 receives a start signal from inverters 36 or 32.

When switch SW2 is closed, the output of inverter 30 becomes high and causes the output of inverter 34 to provide a low logic level signal to the encoder 42 for selection of a supervisory code which indicates that the switch SW2 has changed from an opened to a closed state. The inverter 32 provides an enable or start signal to the power control circuit 38, which drives transmitter 40 on for transmission of the coded signals. This start signal continues until capacitor C2 is charged, whereupon the output level of inverter 32 becomes low to discontinue the start signal. With the input switch opened from a previously closed condition, inverter 36 provides an enabling signal, during the charging interval of capacitor C3, to the power control circuit 38 to turn on the transmitter, and inverter 34 provides a high level signal to the encoder 42 for selection of an alarm code which signifies a transition from a closed to an open switch state.

Figure 3:
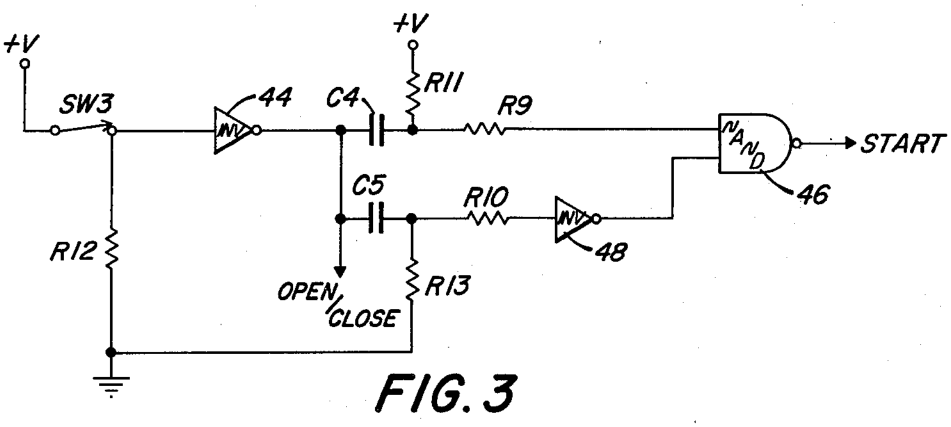
FIG. 3 is a schematic diagram of a further embodiment of the coded security switch circuit.

A further embodiment is shown in FIG. 3 and is similarly operative to the embodiment of FIG. 2. The switch SW3 is coupled via an inverting buffer 44 to one input of a NAND gate 46 via a series RC circuit composed of capacitor C4 and resistor R9. The output of the inverter is also coupled via a second RC series circuit composed of capacitor C5 and resistor R10 and inverter 48 to the second input of NAND gate. The output signal of the NAND gate is the start signal, which can be applied to the programmable encoder, as in FIG. 1, or to the transmitter power control, as in FIG. 2, to enable transmission of the coded switch status. The open/close level provided at the output of the inverter 44 is applied to the encoder to select the corresponding code. A source of positive voltage +V is coupled via a resistor R11 to the junction between capacitor C4 and resistor R9, and is also coupled to the input switch. The input switch terminal is coupled via a resistor R12 to ground, which is also coupled via a resistor R13 to the junction between capacitor C5 and resistor R10.

Figure 4:
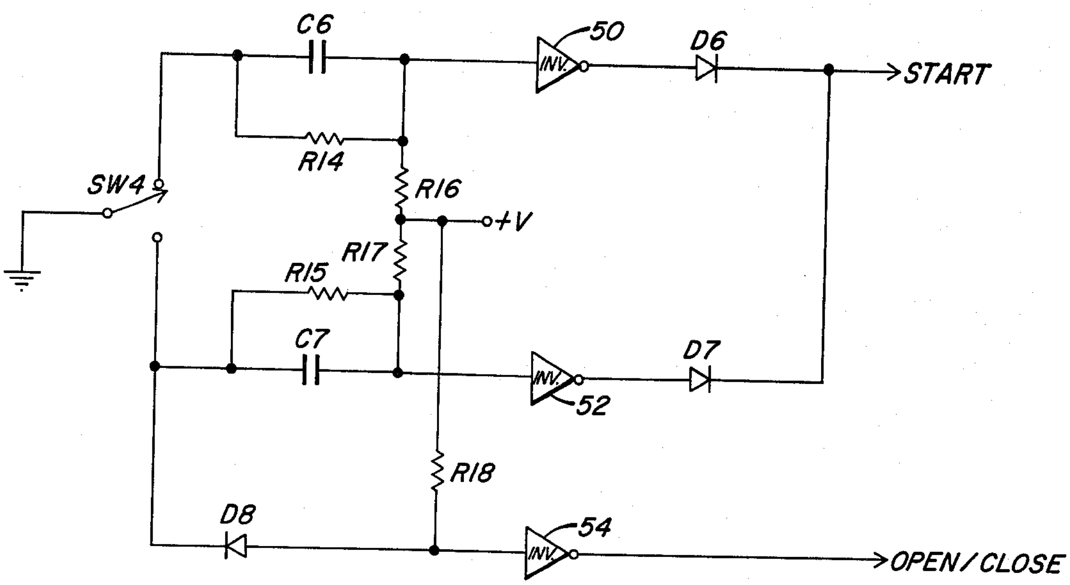
FIG. 4 is a schematic diagram of another embodiment of the coded security switch circuit which is a variation of the embodiment of FIG. 2.

Another embodiment is depicted in FIG. 4 for use with a single pole, double throw switch SW4 which is connected between ground and first or second input terminals. One input terminal is coupled via a parallel RC circuit composed of capacitor C6 and resistor R14 to the input of an inverter 50, the output of which provides by way of a diode D6 the start signal for the encoder or transmitter. The second input terminal is connected via a parallel RC circuit composed of capacitor C7 and resistor R15 to the input of an inverter 52, the output of which provides via a diode D7 the start signal. A source of positive voltage +V is provided via the resistors R16, R17, and R18 as illustrated. The second input terminal is also coupled via a diode D8 to the input of an inverter 54, the output of which is the open/close level which is applied to the encoder for selection of the status code. Operation is similar to that described above.

Figure 5:
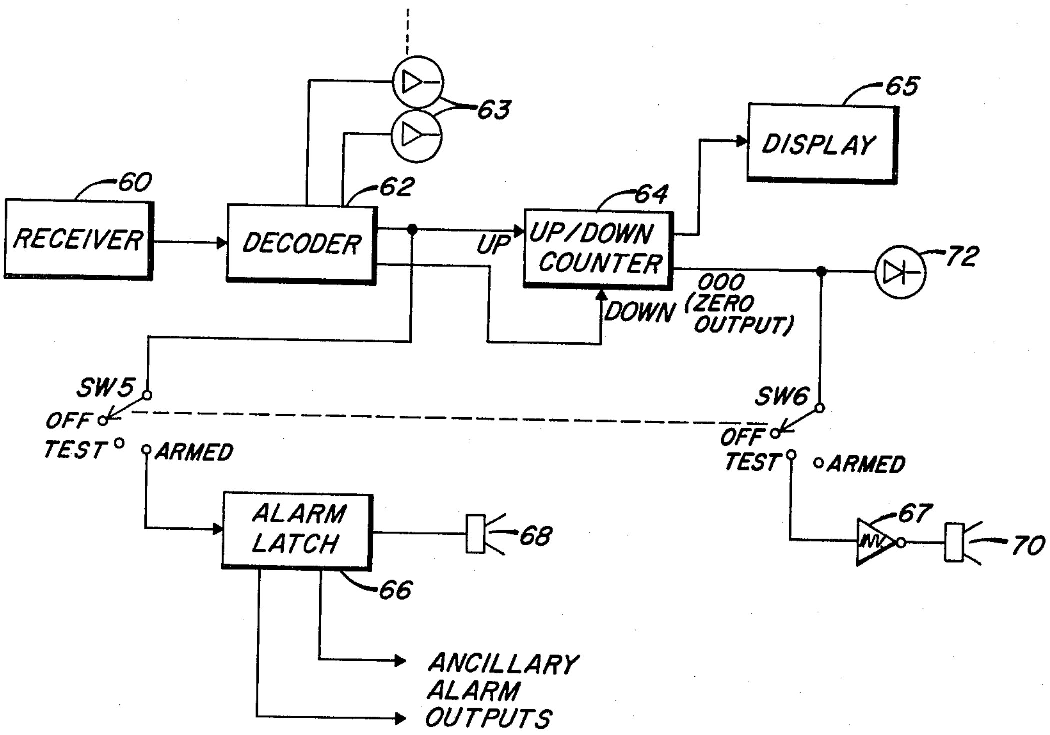
FIG. 5 is a block diagram of the receiving system in accordance with the invention.

The receiving system is shown in FIG. 5 and includes a receiver 60 for receiving and demodulating the transmitted coded signal and providing a demodulated output signal to a decoder 62, which provides control signals to an up/down counter 64. One of the decoder outputs is also coupled by a switch SW5 to an alarm latch 66, which is operative to drive an alarm horn 68 or other alarm indicator, and which can also provide ancillary alarm outputs for operation of automatic telephone dialers or the associated apparatus which is to be energized in response to an alarm condition. The output of the counter 64 denoting a zero count is coupled via a switch SW6 and an inverter 67 to an alarm annunciator 70. This counter output is also operative to drive an LED indicator 72 which denotes that the system is in a ready condition as signified by the zero output of the counter. The counter 64 also provides an output to a numerical display 65 which indicates the count of counter 64. Typically, the switches SW5 and SW6 are ganged together for common switching operation.

With the switches SW5 and SW6 in the off position, the alarm system is not armed, although the receiver 60, decoder 62, and counter 64 remain operative to monitor the status of the switch states so that any changes of state can be decoded. In the test position, the alarm annunciator 70 is activated, for any counter output other than zero output, to warn that the system is not in a ready condition, and will produce an alarm if armed. In the armed position, the system is operative to receive the decoded signal and to provide an alarm indication via alarm latch 66 and horn 68 upon receipt of an alarm code. Initially, the counter 64 is set to zero with all of the monitored switches being in a closed or other non-alarm state. Any subsequent switch opening causes the counter to increment up by one count such that the counter and its display 65 indicate the total number of switches which are open. The identity of each monitored switch can be provided by the encoder 12 which can produce respective codes for the associated switches in a multiple switch sensing system. The status of each switch is decoded as described above, and individual switch status can be denoted by respective indicators 63. For such multi-switch indicators, the decoder 62 is operative in well known manner to decode each of the received switch codes and to activate indicators 63 such as by means of addressable latches.

The invention is not to be limited by what has been particularly shown and described except as indicated in the appended claims.

What is claimed is:

1. For use in an alarm system in which a security switch is monitored to denote the transition state thereof, a circuit comprising:

first gate means including a timing circuit coupled directly to said switch and operative to provide a start signal in response to each switch transition from an open to a closed state and from a closed to an open state and for a time interval determined by the timing circuit;

first means coupled directly to said switch and operative to provide a logic level indicative of the open and closed states of said switch;

transmission means including:

encoder means operative to provide an output code in response to said logic level of the open and closed states of said switch;

a transmitter operative in response to said output code and to said start signal to provide a coded signal for transmission along a communications path and representative of the transition states of said switch for each said switch transition.

2. The circuit of claim 1 wherein said transmission means is operative to provide said coded signal for a predetermined duration specified by the timing circuit.

3. The circuit of claim 1 including timer means operative to provide a test pulse to said encoder means to cause the transmission of a coded signal representing a test condition.

4. The circuit of claim 3 including circuit means operative to monitor the voltage of a battery source and to provide a low battery signal to said encoder means to cause the transition of a coded signal representing such low battery condition.

5. The circuit of claim 1 including timer means operative to provide a test pulse to said encoder means at a predetermined time intervals to cause the transmission of a coded signal representing a test condition.

6. The circuit of claim 5 wherein said timer means provides the test pulse to a start terminal of the encoder means thereby to turn on the encoder means, and to a test terminal of the encoder means thereby to produce the coded signal representing a test condition.

7. For use in an alarm system in which a security switch is monitored to denote the transition state thereof, a circuit comprising:

first gate means including a timing circuit coupled directly to said switch and operative to provide a start signal in response to each switch transition from an open to a closed state and from a closed to an open state and for a time interval determined by the timing circuit;

first means coupled directly to said switch and operative to provide a logic level indicative of the open and closed states of said switch;

a programmable encoder operative to receive said start signal from said first gate means and said logic level from said first means and to provide an output code for the duration of the timing interval and representative of the transition state of said switch; and transmitter means operative in response to said output code and for a time interval determined by said start signal to provide a coded signal of a form for transmission along an intended communications path.

8. The circuit of claim 7 wherein said switch is a single pole, single throw switch;

and wherein said first gate means includes:

a first exclusive OR gate which provides a first logic level output in response to a switch transition;

a second exclusive OR gate which provides a predetermined logic level output in response to the output of the first exclusive OR gate; and a timing circuit coupling the first exclusive OR gate to the second exclusive OR gate and operative in response to said first logic level output to cause said second exclusive OR gate to change state, the output of said second exclusive OR gate being said start signal.

9. The circuit of claim 8 wherein said first means derives the logic level indicative of the open and closed states of the switch from a source of reference potential.

10. The circuit of claim 9 further including circuit means operative to monitor the voltage of a battery source and to provide a low battery signal to said encoder, comprising:

circuit means for providing a low battery signal when the battery voltage falls below a predetermined reference voltage; and gate means operative in response to the low battery signal to provide an input signal to the encoder to cause provision of an output code denoting the low battery condition.

11. The circuit of claim 7 wherein said switch is a single pole, single throw switch;

and wherein said first gate means includes:

a first inverter operative to provide a predetermined logic level output in response to one switch transition;

a second inverter operative to provide said start signal in response to an opposite switch transition;

a third inverter operative to provide said start signal in response to the output from said first inverter;

a first timing circuit coupling the first inverter to the third inverter and operative to determine the duration of the start signal provided by the third inverter;

a second timing circuit coupling the switch to the second inverter and operative to determine the duration of the start signal provided by the second inverter.

12. The circuit of claim 11 wherein said first means includes an inverter coupled to the output of said first inverter and operative to provide said logic level indicative of the open and closed states of the switch.

13. The circuit of claim 7 wherein the programmable encoder includes a start terminal to which said start signal from said first gate means is applied to enable the encoder, and a data terminal to which said logic level from said first means is applied to cause generation of the coded signal representative of the transition state of said switch.

14. An alarm system in which at least one security switch is monitored to denote the states thereof, comprising:

first gate means including a timing circuit coupled directly to said switch and operative to provide a start signal in response to each switch transition from an open to a closed state and from a closed to an open state and for a time interval determined by the timing circuit;

first means coupled directly to said switch and operative to provide a logic level indicative of the open and closed states of said switch;

transmission means including:

encoder means operative to provide an output code in response to said logic level of the open and closed states of said switch and for the duration of the timing interval;

a transmitter operative in response to said output code and to said start signal to provide a coded signal for transmission along a communications path and representative of the transition states of said switch for each said switch transition;

receiver means operative to receive the coded signal from said transmitter means and to demodulate the received signal;

a decoder operative to decode the demodulated signal; and means for indicating alarm status.

15. The system of claim 14 wherein said means for indicating alarm status includes:

counter means operative in response to signals from said decoder to provide an output count which denotes the number of monitored switches which are in an alarm state; and display means for indicating such alarm state.

* * * * *

UNITED STATES PATENT AND TRADEMARK OFFICE
CERTIFICATE OF CORRECTION

PATENT NO. : 4,396,910

DATED : August 2, 1983

INVENTOR(S) : Robert B. Enemark, Stephen Marchetti

It is certified that error appears in the above—identified patent and that said Letters Patent is hereby corrected as shown below:

Column 2, line 55, "cmmunication" should read --communication--
Column 5, line 55, "indicators," should read --indication,--
Column 6, lines 30-31, "at a predetermined" should read --at predetermined--
Column 6, line 60, "path.", should read --path for each said switch transition.--

Signed and Sealed this

*Twentieth* Day of *March 1984*

[SEAL]

*Attest:*

GERALD J. MOSSINGHOFF

*Attesting Officer* *Commissioner of Patents and Trademarks*